United States Patent
Kono et al.

(10) Patent No.: US 6,424,676 B1
(45) Date of Patent: Jul. 23, 2002

(54) MOTION VECTOR DETECTING METHOD AND DEVICE, AND STORAGE MEDIUM

(75) Inventors: Takehiko Kono; Shunichi Takeuchi; Nobuyuki Sashida, all of Tokyo (JP)

(73) Assignee: Custom Technology Corp., Tokyo (JP)

( * ) Notice: Subject to any disclaimer, the term of this patent is extended or adjusted under 35 U.S.C. 154(b) by 0 days.

(21) Appl. No.: 09/358,208

(22) Filed: Jul. 21, 1999

(30) Foreign Application Priority Data

Aug. 3, 1998 (JP) .......................................... 10-218424

(51) Int. Cl.[7] .............................................. H04N 7/32
(52) U.S. Cl. .............. 375/240.16; 348/699; 375/240.24
(58) Field of Search ..................... 348/699; 375/240.16, 375/240.24, 240.12; H04N 7/12, 7/32

(56) References Cited

U.S. PATENT DOCUMENTS 6,128,047 A  * 10/2000 Chang et al. ................ 348/699
6,249,550 B1 *  6/2001 Mizuno et al. ......... 375/240.24
6,330,282 B1 * 12/2001 Miyazaki ............... 375/240.16

* cited by examiner

Primary Examiner—Howard Britton
(74) Attorney, Agent, or Firm—Bachman & LaPointe, P.C.

(57) ABSTRACT

An improved motion vector detecting method is provided that can ensure a wide search area while suppressing detection of erroneous motion vectors at the same time. Specifically, when detecting motion vectors from a first and a second image frame, the method divides the second image frame into blocks, classifies the blocks into a first and a second group such that the mutually adjacent blocks belong to the different groups. The method specifies a motion vector candidate for each of the blocks in the first and second groups, then performs the process of updating the motion vector candidate by studying an average of the motion vector candidates of the adjacent blocks for each of the blocks in the first and second groups. The process is repeated for a certain time.

13 Claims, 7 Drawing Sheets

| B0 | B1 | B0 | B1 | B0 | B1 | | |
|----|----|----|----|----|----|---|---|
| B1 | B0 | B1 | B0 | B1 | B0 | | |
| B0 | B1 | B0 | B1 | B0 | B1 | | |
| B1 | B0 | B1 | B0 | B1 | B0 | | |
| B0 | B1 | B0 | B1 | B0 | B1 | | |
| B1 | B0 | B1 | B0 | B1 | B0 | | |
|    |    |    |    |    |    | | |

MOTION VECTOR DETECTING METHOD AND DEVICE, AND STORAGE MEDIUM

BACKGROUND OF THE INVENTION

1. Field of the Invention

The present invention relates to a motion image data coding technique and, in particular, to a method of efficiently detecting motion vectors included in motion image data.

2. Description of the Related Art

When transferring motion image data through a communication medium for a video conference, or recording them on a DVD (Digital Versatile Disk) or the like, the data are normally coded in order to reduce the size.

Normally, motion image data are composed of a plurality of image frames and it is well known that efficient coding is possible by utilizing temporal correlation. For example, if there are two image frames #1 and #2 obtained at time t1: and the t2, respectively, efficient compression can be performed by compressing instead of the image frame #2 an image frame #12 representing difference data between the frames #1 and #2. This is because the image frame #12 is data produced by utilizing the temporal correlation between the image frames #1 and #2 and that has small values upon normal image movements.

Nowadays, there have been proposed various methods to get higher compression ratios by using efficient coding techniques.

One of the known techniques for raising the compression ratio is a technique that detects motion vectors between contiguous image frames and codes the vectors. Sample implementation of this technique is done by dividing the image frame #2 into small blocks, i.e. 16×16 square blocks, and for each of the blocks, searching for a small area in the image frame #1 that resembles the block, and calculating difference data between the block and the small area in the image frame #1. Then, the mean absolute of the difference data is calculated. Because this mean absolute is smaller than that of the image frame #12, more efficient coding is possible. Although an offset from the detected small area should be coded as a "motion vector" with the difference data in this case, data size after coding will almost always be smaller than that which does not use the motion vector.

The detection of an offset between a block in the image frame #2 and a small area in the image frame #1 that resembles the block in the image frame #2 is called "motion vector detection". Specifically, a motion vector_mb_is detected such that the sum of each value calculated by an evaluation function applied to a pixel in a square block G2 in the image frame #2 and the corresponding pixel in a square block G1 in the image frame #1 is minimum. Normally, the absolute or square of a difference is used as an evaluation function.

Now, the primary problem on the motion vector detection is the method of searching for a block in an image frame corresponding to the subject block in another image frame. One of the well-known methods is a so-called "full search method".

The full search method uses an error evaluation function to express the similarity between two pixels, that is, it regards a block whose sum of values of an error evaluation function is minimal as a block that most resembles the subject block. The error evaluation function is expressed by ferror(pixel 1, pixel 2), namely, the absolute value of a difference between pixel 1 and pixel 2 (|pixel 1−pixel 2 |) or the square of a difference ((pixel 1−pixel 2)×(pixel 1−pixel 2)). Now let (x, y) be a position in an image frame and A be a square block containing the position (x, y). And let A(bx, by) be a pixel in the block A. On the other hand, let B be a block in the image frame in which motion vectors are to be searched, let (x+dx, y+dy) be a point in B that corresponds to the point (x, y) in A, and let B(bx, by) be a pixel in B. And let E(dx, dy) be a sum of values, each value being calculated by an error evaluation function whose parameters are a point in A and the corresponding point in B. Then the sum E(dx, dy) can be expressed as the following equation:

$$E(dx, dy)=\Sigma bx(\Sigma by(\text{ferror}(A(bx, by), B(bx, by))))$$

If the range of dx is from dx1 through dx2, and the range of dy is from dy1 through dy2, the full search is done by searching the square defined by (dx1, dy1) and (dx2, dy2) in order to find a motion vector.

Although the full search is supposed to achieve the precise motion vector detection, it has the following problems.

First, calculation will be extensive. To keep up with faster movements, the searching area should be expanded. That is to say, the search area should be wide enough to contain the actual motion vector for the precise detection, which requires a huge amount of calculation.

Second, the search result depends on the search order. That is, since the sums of values of the error evaluation function may have the same value at different points, the point to be chosen win depend on the search order. As a result, it is possible that a motion vector that is not reflecting the actual movement is found. Especially, if the image texture is flat or a repeating pattern exists, it is more likely for the sums of values of the error evaluation function to have similar values at different points. In this case, a square block that resembles the reference block will be found, which is far from the actual movement. The motion vector thus detected does not reflect the actual movement.

Furthermore, the full search is carried out assuming the image's simple parallel movement and no noise. But actual moving images are always transforming and there are some cases in which noise comes in. In this case, the motion vector that gives the minimum value of a mean error evaluation function does not necessarily reflect the actual movement. Especially, if a search area is expanded in order to catch hold of fast moving objects, the chance of erroneous detection will be increased. In this case, the erroneous vector may be a considerably long vector. As the result, the difference may be small but the total code length may be long, because the vector should also be coded at the time of data coding. Thus, the coding efficiency is decreased.

Since it is difficult for the full search method to search a wide area and detect the correct motion vector, there are considered some other methods which can reduce calculation, such as a subsampling search method, a sparse position search method, or a hierarchical search method using reduced resolution.

(1) Subsampling Search Method

When calculating a value with a mean error evaluation function, the subsampling search method picks some representative points Instead of every point for the calculation. For example, assuming that the size of a square block is 16×16 pixels, it does not use every point (256 pixels) for the calculation. Instead it uses only a half of them (128 pixels) or a quarter of them (64 pixels), in this method, the target pixels are subsampled so that the precision of motion vector detection will be less than the full search. Especially, if the value of an error evaluation function at a skipped pixel is considerably different from the average, miss detection will occur.

(2) Sparse Position Search Method

The sparse position search method does not implement point by point search in a search area. Instead, it detects a motion vector candidate from a coarse search area first, then, gradually raising the precision. For example, it first searches every four pixels to get a motion vector candidate A, then from the motion vector candidate A, it searches every two pixels to get a motion vector candidate B, and finally it searches point by point around the point B to get a final motion vector C.

Since this method is likely to overlook changes of the space around edges, the precision of motion vector detection is less than the full search. Moreover, since this method restricts motion vectors at the point of coarse search, it cannot detect the correct motion vector once the wrong motion vector candidates are chosen.

It is possible to use a combination of the sparse position search method and the subsampling search method. In this case, calculation is further reduced but the possibility of miss detection Will be raised.

(3) Hierarchical Search Method Using Reduced Resolution

The hierarchical search method using reduced resolution detects a motion vector candidate using an image with reduced resolution, then gradually lowers the reduction ratio to get more precision. For example, a motion vector A is first obtained from the image reduced to a quarter of the original image. Then, a motion vector B is obtained from the image reduced to a half of the original image by searching, from the point that is relatively the same as the motion vector A. Finally, a motion vector C is obtained from the original image by searching from the point that is relatively the same as the motion vector B.

Considering the amount of calculation, this method is similar to the combination of the sparse position search method and the subsampling search method, because using the reduced resolution has the same effect as that of sampling search points and pixels. especially, if a simple sampling method is applied to generate an image with reduced resolution, the calculation amount is exactly the same as that of the combination of the sparse position search method and the subsampling search method.

With this method, a minute texture of the original image will be lost by the image reduction, so that the precision of motion vector detection is less than the full search on the image that includes the minute texture. Also, the precision of motion vector detection depends on the way of generating the reduced image. If the reduced image is generated not by the simple sampling method but by a method in which, for example, a half size image is generated by calculating the average of weighed 2×2 pixels or more pixels to get a pixel in the reduced image, the motion vector detected by this method is more precise than that by the combination of the sparse position search method and the subsampling search method. This is because every pixel is referred to upon image reduction, while the subsampling search method simply ignores a half or more pixels. The similar argument can be given on the sparsc position search method, i.e. while the sparse position search method may overlook edge information, this method may not. This is because the hierarchical search method using reduced resolution uses the full search on the reduced resolution, while the sparse position search method simply ignores intervening search points.

Nevertheless, like the sparse position search method, the detected motion vector does not always give the minimum value of the mean error evaluation function, because this method first restricts motion vector candidates at coarse searching points. Also, if a wrong motion vector is chosen before raising precision, the correct motion vector can not be detected afterwards.

It is possible to use the hierarchical search using reduced resolution together with the sparse position search method and/or the subsampling search method. In this case, the amount of calculation will be further reduced, but the merit of the precision of motion vector detection will also be lost. That is, the amount of calculation and the detecting precision are in a trade-off relation.

In any cases, it requires a fairly large amount of calculation to get a certain precision on detection. For this reason, a custom LSI that is able to do parallel processing has been used up to now rather than software which is read by and runs on a CPU or MPU in order to detect motion vectors. Nevertheless, since the processing speed of CPU's is becoming higher and higher every year, implementation by software which can enable a more flexible processing form is emerging. Even if not thoroughly done by software, some layers, for example, all but the final stage can be done by software. In this case, the final stage at which searching is done pixel by pixel will be implemented on hardware.

The current obstacle of motion vector detection done by software is that the real-time processing can not be assured because of the huge amount of calculation for detecting corresponding sets of pixels between image frames. Conversely, if too much weight is put on the real-time processing, the detecting precision will considerably be decreased. Especially, if the full search is used while assuring the real-time processing, a very limited area can only be searched.

SUMMARY OF THE INVENTION

Therefore, it is an object of the present invention to provide an improved motion vector searching technique which makes use of the merits of the foregoing searching methods so as to keep a wide searching area while reducing the chance of detecting a wrong motion vector at the same time, and further provide an improved method that enables the implementation by software.

According to one aspect of the present invention, there is provided a motion vector detecting method comprising the steps of, when detecting motion vectors between a first and a second image frame which are contiguous:

(1-1) dividing the second image frame into blocks;
(1-2) classifying the blocks into a first and a second group such that the mutually adjacent blocks belong to the different groups:
(1-3) specifying a motion vector candidate for each block in the first group based on a mean error evaluation function between the first and second image frames;
(1-4) assigning an average of the motion vector candidates of the adjacent blocks in the fist group to a motion vector candidate for each of the blocks in the second group;
(1-5) updating the motion vector candidate of each of the blocks in the first group by assigning thereto an average of the motion vector candidates of the adjacent blocks in the second group.

By using the foregoing method, the amount of calculation can be reduced as compared to a method that calculates a mean error evaluation function for each of the blocks in the second group.

According to another aspect of the present invention, there is provided a motion vector detecting method comprising:.
(2-1) a pre-process step of capturing a first and a second image frame which are contiguous, holding the first image frame, dividing the second image frame into blocks, and classifying the blocks into a first and a second group such that the mutually adjacent blocks belong to the different groups;
(2-2) an initial search step of specifying a motion vector candidate for each of the blocks in the first group that points to a search point in the first image frame by choosing a vector from the corresponding block that gives a minimal value of a mean error evaluation function, and specifying a motion vector candidate for each of the blocks in the second group by assigning thereto an average of the motion vector candidates of the adjacent blocks In the first group;
(2-3) a first detailed search step of updating the motion vector candidate of each of the blocks in the first group by studying an average vector represented by an average of the motion vector candidates of the adjacent blocks in the second group:
(2-4) a second detailed search step of updating the motion vector candidate of each of the blocks in the second group by studying an average vector represented by an average of the motion vector candidates of the adjacent blocks in the first group:
(2-5) a step of setting the updated motion vector candidate as a motion vector for each of the blocks.

It may be arranged that the study of the average vector is performed by moving a search point, to which the average vector points, to a specified direction and updating a current motion vector candidate if the calculated mean error evaluation function value is less than that of the current motion vector candidate.

It may be arranged that if a difference between the current motion vector candidate and the average vector is greater than a predetermined threshold value, the current motion vector candidate is replaced with the average vector and a point to which the average vector points is set as a new starting point of the search point.

It may be arranged that if the value of the mean error evaluation function is not greater than a current convergence error level, the study of the average vector of the next block in the same group is immediately carried out. It is preferable that performing the first detailed search step and the second detailed search step in turn makes it possible to lower the convergence error level. This can gradually increase the vector detection accuracy.

According to another aspect of the present invention, there is provided a motion vector detecting device comprising:
(3-1) an image frame capturing section which captures a first and a second image frame that are contiguous;
(3-2) a pre-processing section that divides the second image frame into blocks and classifies the blocks into a first and a second group such that the mutually adjacent blocks belong to the different groups;
((3-3) a motion vector study section that approximately specifies a motion vector candidate for each of the blocks in the first group and a motion vector candidate for each of the blocks in the second group, and studies each of the motion vector candidates based on an average vector represented by an average of the motion vector candidates of the adjacent blocks so that a value of a mean error evaluation function becomes smaller.

It may be arranged that the motion vector study section approximately specifies the motion vector candidates for all the blocks. and then studies the average vector for each of the blocks in the first group and the average vector for each of the blocks in the second group alternately.

It may be arranged that the motion vector study section studies the average vector of the next block in the same group immediately if the value of the mean error evaluation function is not greater than a predetermined convergence error level, and that the convergence error level is reduced upon repeating the study of the average vector.

According to another aspect of the present invention, there is provided a computer-readable recording medium storing a program which causes a computer to execute the steps of:
(4-1) capturing a first and a second image frame which are contiguous, holding the first image frame, dividing the second image frame into blocks, and classifying the blocks into a first and a second group such that the mutually adjacent blocks belong to the different groups;
(4-2) specifying a motion vector candidate for each of the blocks in the first group that points to a search point in, the first image frame by choosing a vector from the corresponding block that gives a minimal value of a mean error evaluation function:
(4-3) specifying a motion vector candidate for each of the blocks in the second group by assigning thereto an average of the motion vector candidates of the adjacent blocks in the first group;
(4-4) updating the motion vector candidate of each of the blocks in the fist group by studying an average vector represented by an average of the motion vector candidates of the adjacent blocks in the second group;
(4-5) updating the motion vector candidate of each of the blocks in the second group by studying an average vector represented by an average of the motion vector candidates of the adjacent blocks in the first group;
(4-6) setting the updated motion vector candidate as a motion vector for each of the blocks.

BRIEF DESCRIPTION OF THE DRAWINGS

The present invention will be understood more fully from the detailed description given hereinbelow, taken in conjunction with the accompanying drawings.

In the drawing.

DESCRIPTION OF THE PREFERRED EMBODIMENT

Now, a preferred embodiment of the present invention will be described hereinbelow, wherein the present invention is applied to prediction coding of motion image data that utilizes, as with MPEG, a correlation between image frames.

Figure 1:
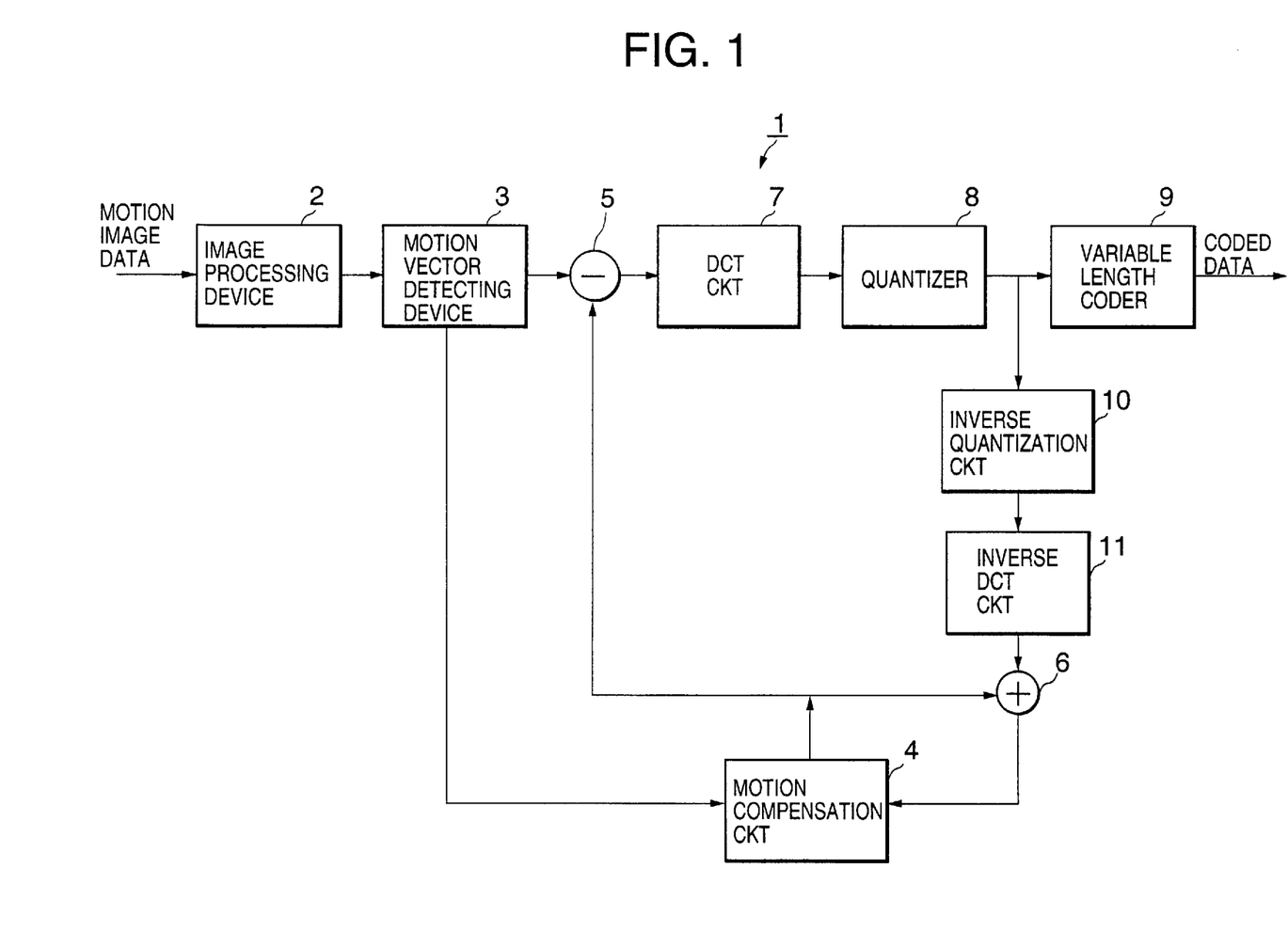
FIG. 1 is a diagram showing a configuration of a prediction coding device to which the present invention is applied.

FIG. 1 is a diagram showing a main configuration of a prediction coding device 1 according to the preferred embodiment of the present invention.

In the prediction coding device 1, an image processing device 2 divides inputted motion image data into image frames and sends the data (pixels) of each image frame to a motion vector detecting device 3, which realizes the present invention. The motion vector detecting device 3 detects a motion vector by comparing data of a current image frame (target frame data) and data of a previous image frame (reference frame data) and sends the detected motion vector to a motion compensation circuit 4. Also it sends the target frame data directly to a subtracter 5.

The motion compensation circuit 4 has a frame memory and compensates a motion component of the reference frame data stored in the frame memory by the foregoing motion vector. Now the term "compensation" here means the compensation of motion components for coding, and does not include difference data described below. The motion compensated reference frame data are sent to the subtracter 5 and an adder 6. The subtracter 5 subtracts the target frame data from the motion compensated frame data and sends the difference data to a DCT (Discrete Cosine Transform) circuit 7. The DCT circuit 7 performs DCT to the difference data and sends the result to a quantizer 8. The quantizer 8 quantizes the DCT-ed difference data and sends the result to a variable length coder 9. Thus, coded data are outputted.

While the DCT-ed difference data are transferred to the quantizer 8, they are also transferred to an inverse quantization circuit 10 and an inverse DCT circuit 11 so that the original difference data are reconstructed and then inputted into the adder 6. The adder 6 adds the foregoing reference frame data and the reconstructed difference data. In this way, the target frame data are reconstructed. The reconstructed target frame data are kept in the frame memory of the motion compensation circuit 4 as the next reference frame data.

Thus, in the prediction coding device 1, the difference data between the target frame data and the reference frame data compensated by the motion vector are variable length coded.

Now a configuration of the motion vector detecting device 3 will be described. As described later, the motion vector detecting device 3 can largely reduce an amount of calculation compared with the conventional one. Thus, in this preferred embodiment, the motion vector detecting device 3 is realized by software rather than by a custom LSI which can also realize it.

Figure 2:
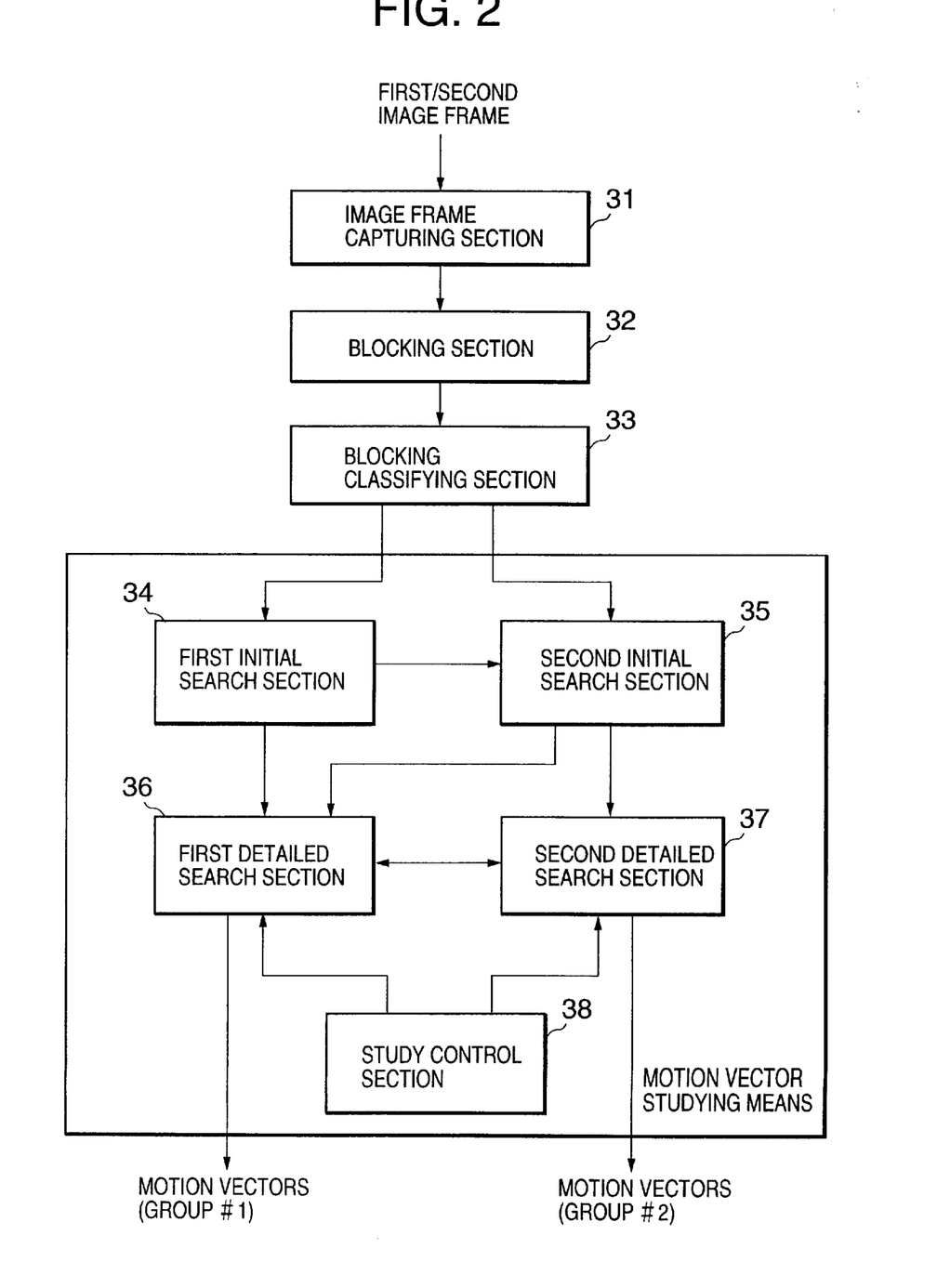
FIG. 2 is a functional block diagram of a motion vector detecting device according to a preferred embodiment of the present invention.

Specifically, by causing a computer installed with an operating system (OS) to read and execute given program codes, functional blocks shown in FIG. 2 are formed on the computer so that the motion vector detecting device 3 is realized.

Normally, program codes are stored on a storage medium and read all together at once into a memory of a computer, but may also be read at an appropriate time into the memory from the storage medium during run time. The storage medium may be a semiconductor memory, a hard disk, an optical disk, a magneto-optical disk, a CD-ROM, a CD-R, a DVD, a magnetic tape or a program server with a communication path through which the system is accessible thereto.

Further, the present invention includes not only the case in which the foregoing functions are realized by executing the foregoing program codes, but also the case in which an OS running on a computer executes a part of the processing based on the foregoing program codes so that the foregoing functions are realized.

The computer may be in the form of a stand-alone computer, distributed multiple computers, or multiple computers that can communicate with each other under network environment.

Referring to FIG. 2, the motion vector detecting device 3 comprises the functional blocks of an image frame capturing section 31, a blocking section 32, a block classifying section 33, a first initial search section 34, a second initial search section 35, a first detailed search section 36, a second detailed search section 37 and a study control section 38. The first initial search section 34, the second initial search section 35, the first detailed search section 36, the second initial search section 37 and the study control section 38 cooperatively form a motion vector studying means.

The image frame capturing section 31 captures temporally contiguous frame data, and the blocking section 32 divides target frame data into a plurality of blocks. The block classifying section 33 classifies the blocks into groups #1 and #2, respectively, such that all the adjacent blocks belong to one of groups #1 and #2 while a subject block belongs to the other group.

Figure 3:
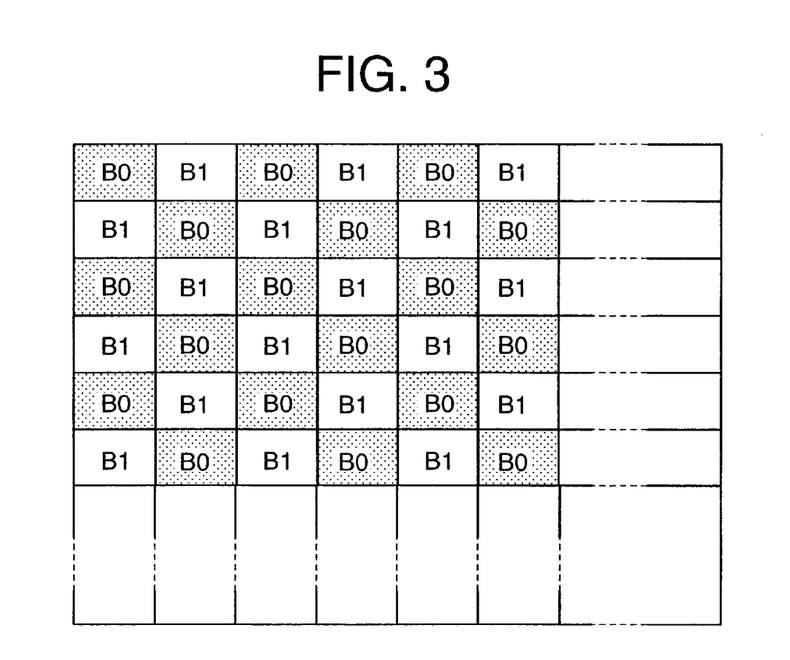
FIG. 3 is a diagram for explaining a structure of current frame data that is divided into blocks of groups #1 and #2.

FIG. 3 illustrates a structure of the target frame data after classification. In the figure, blocks labeled "B0" belong to group #1, and blocks labeled "B1" belong to group #2. As seen from the figure, in this preferred embodiment, the blocks are laid out such that the blocks at the upper, lower, left and right sides of the subject block belong to the same group while the subject block belongs to the other group.

The first initial search section 34 searches and specifies a motion vector candidate for each of the blocks in group #1 that points from the block to a corresponding point in reference frame data.

Figure 5:
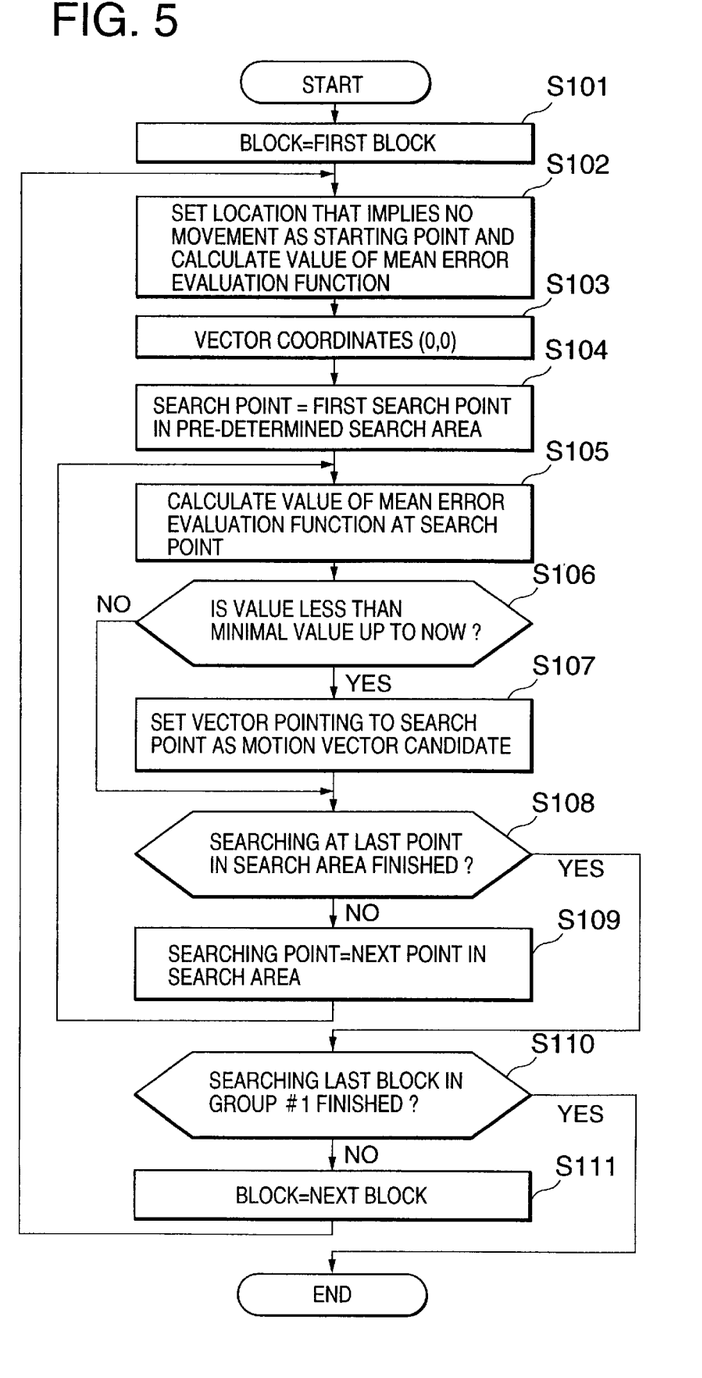
FIG. 5 is a flowchart showing a routine to be executed by a first initial search section.

Specifically, as shown in FIG. 5, it prepares the first block of the target frame, searches the same position in the reference frame data, and specifies the position as a starting point (0, 0) on which a value of a mean error evaluation function is calculated (steps S101, S102). And let the vector coordinates pointing to the location in the reference frame data be (0, 0) (step S103).

Then it sets a fist search point (step S104) in a predetermined search area, i.e. a set of pixels that locates at most few pixels away from the starting point, sets predetermined precision and calculates a value of a mean error evaluation function at the point (step S105). Then it checks the value to see whether it is smaller than the minimum value up to now, and if so, it keeps the vector coordinates pointing to the search point as a motion vector candidate (step S106; Yes, step S107). Since it has no motion vector candidate at first, it keeps (0, 0) which are the vector coordinates at that time.

It performs repeatedly steps S105 through S109 by moving the search point to the next until it reaches the last search point in the predetermined area. Then it proceeds to the next block in group #1 and performs steps S102 through S110 or S111.

In this way, it specifies motion vector candidates whose number is the same as that of the blocks In group #1. But at this stage, the precision is limited or they possibly have large amounts of errors.

The second initial search section 35 searches and specifies a motion vector candidate for each of the blocks in group #2 that points from the block to a corresponding point in the reference frame data.

Figure 6:
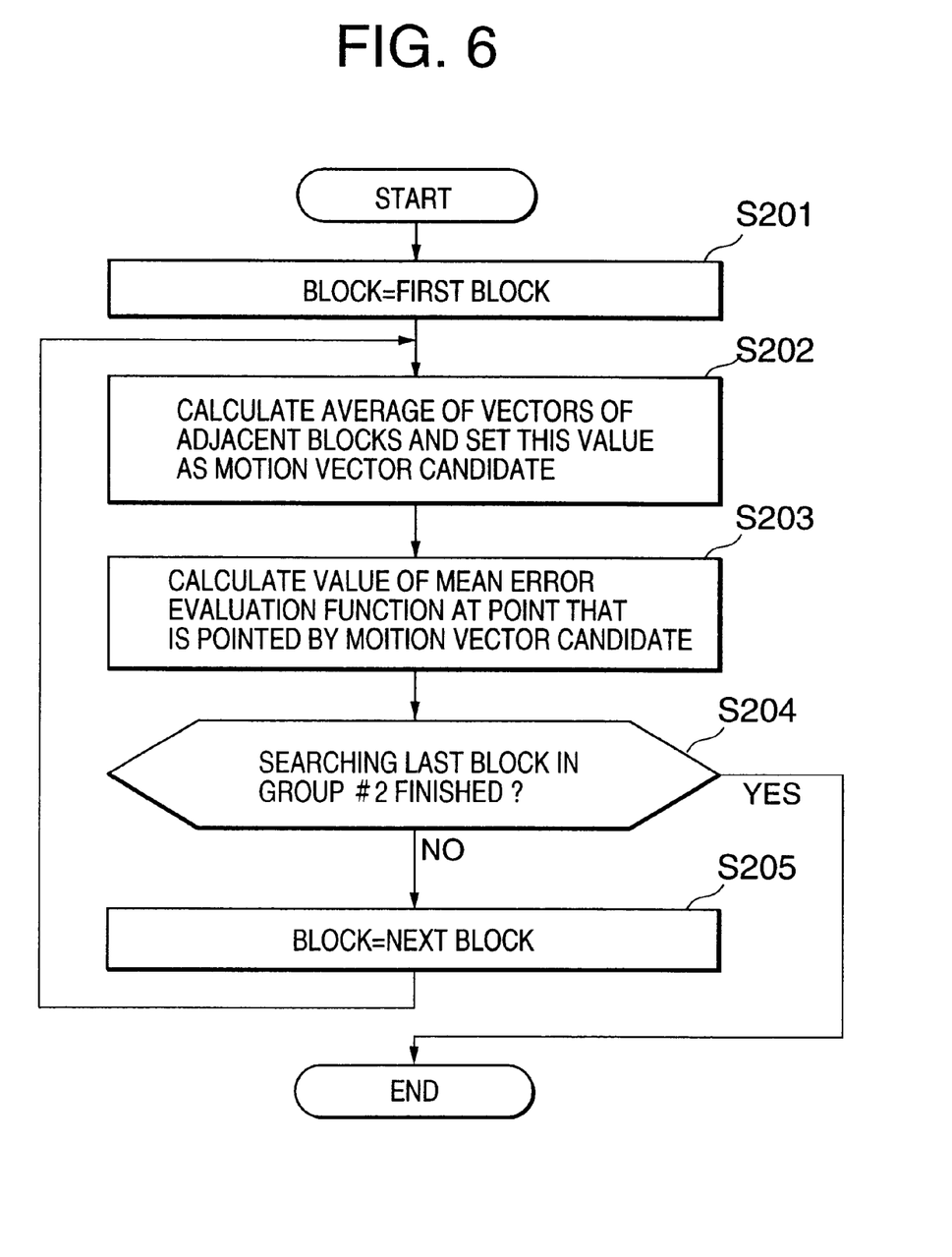
FIG. 6 is a flowchart showing a routine to be executed by a second initial search section.

Specifically, as shown in FIG. 6, for the first block, it calculates the average of the motion vector candidates of the adjacent blocks in group #1, then assigns the average vector coordinates to a motion vector candidate of the first block (steps S201, S202). Furthermore, it calculates a value of a mean error evaluation function on the motion vector candidate that points to a point in the reference frame (step S203). And it performs the same process on each block In group #2 (step S204). In this way, it specifies motion vector candidates whose number is the same as that of the blocks in group #2.

It is to be noted that step S202 is not necessary if just to specify. motion vector candidates.

The first detailed search section 36 studies the average of the motion vector candidates of the adjacent blocks in group #2 and updates the motion vector candidate for each block in group #1, while the second detailed search section 37 studies the average of the motion vector candidates of the adjacent blocks in group #1 and updates the motion vector candidate for each block in group #2.

Figure 7:
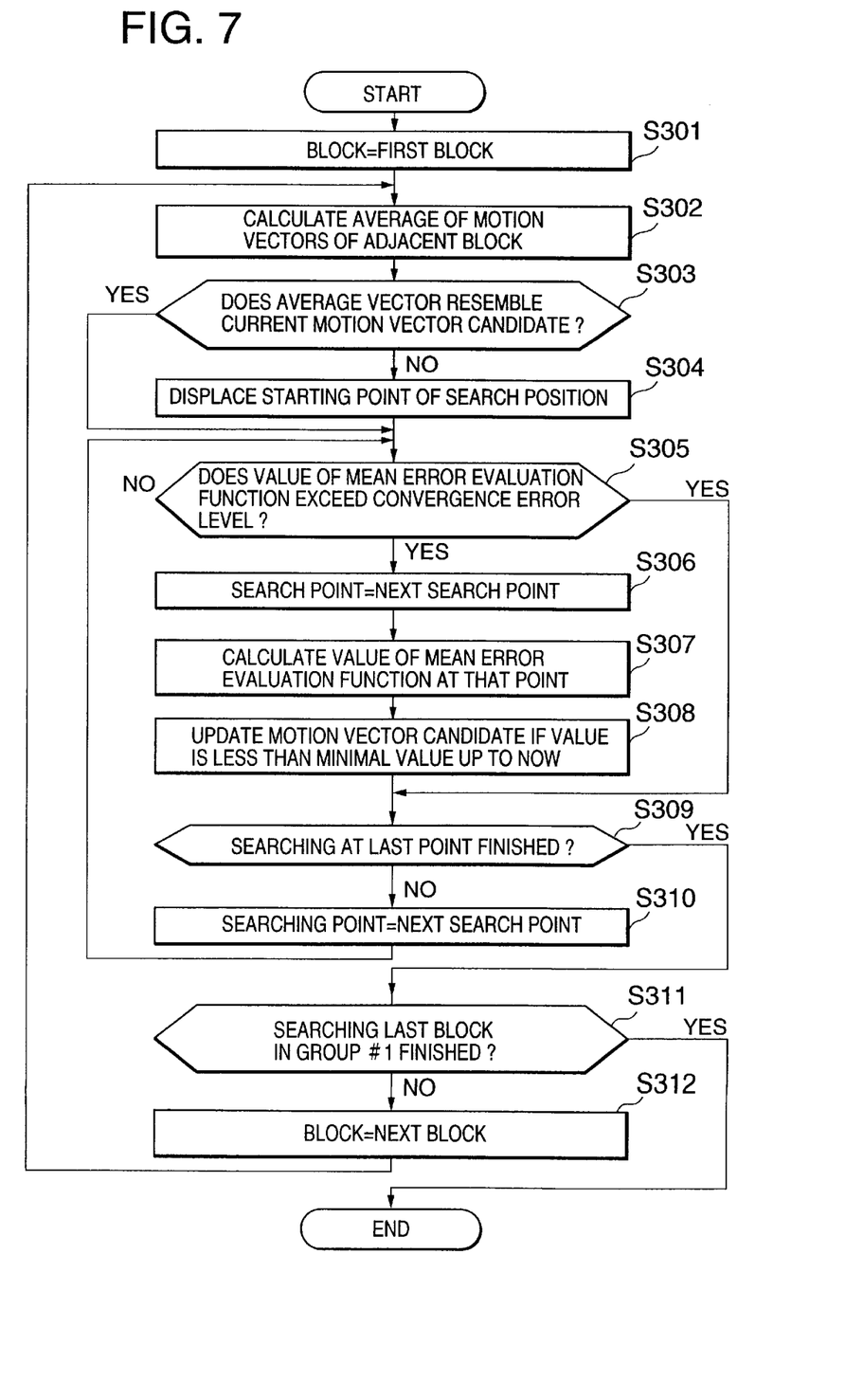
FIG. 7 is a flowchart showing a routine to be executed by a first detailed search section.

The studying process in the first detailed search section 36 is performed as shown in FIG. 7. As a prerequisite, a search path of search points should be determined beforehand. For example, the search path may form a spiral from an initial search point. For convenience, the following process describes a case that does not consider a time limit for the studying process.

First, it calculates the average of the motion vector candidates of the adjacent blocks which are located at the upper, lower, left and right sides of the subject block (steps S301, S302). Then, it checks to see whether a difference between this average vector and the current motion vector candidate of the subject block is less than a predetermined threshold value or not (step S303). If there is no noise in the vector, the difference should be small, and vice versa. Thus, noisy vectors can be avoided.

Figure 4:
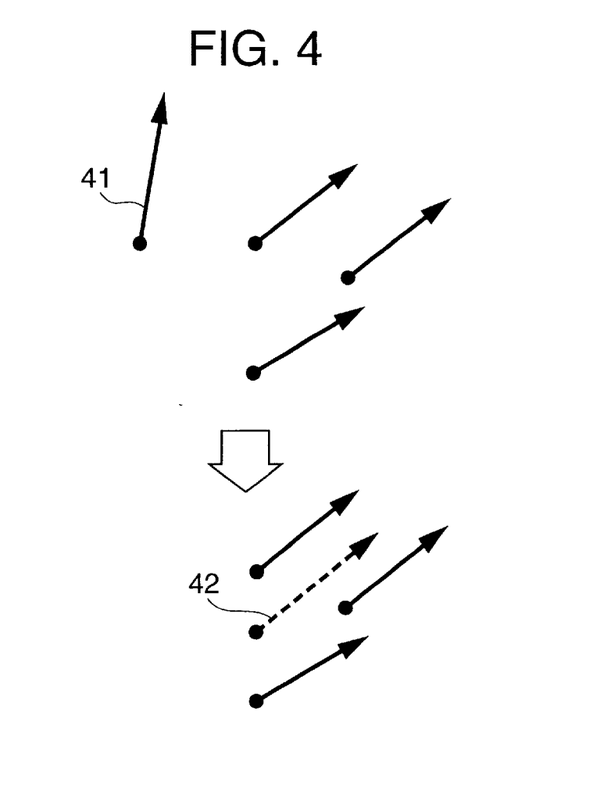
FIG. 4 is a diagram wherein an upper illustration shows vectors that include an erroneous motion vector and a lower illustration shows vectors that include an average motion vector.

For example, in FIG. 4, a noisy vector 41 is Included. This vector 41 seems to have widely different direction and length compared to other vectors. So it checks the similarity between the vector and the other vectors at step S303 and, if not found to be similar, it uses the average vector instead of the noisy vector to cancel the noise. A vector 42 shown in FIG. 4 represents the average vector.

If the current motion vector candidate was not found to be similar to the average vector at step S303, it sets the average vector to be a new motion vector candidate, calculates a value of a mean error evaluation function at the point to which the new vector points, and sets this point as a starting point of the search path (step S304). On the other hand, if the current motion vector candidate was found to be similar to the average vector, it calculates a value of a mean error evaluation function at that point.

Subsequently, at step S305, it compares the calculated value with a "convergence error level" which is determined at the study control section 38. If the value exceeds the convergence error level, it Judges that the correct motion vector is not detected, and proceeds to the next step.

First, it moves the search point of the block to the next location, then calculates a value of a mean error evaluation function at that point (step S305 : Yes, steps S306, S307). If the value is less than the minimal value up to now, it replaces the minimal value and updates the motion vector candidate with a vector pointing to that location (step S308).

On the other hand, if the value of the mean error valuation function is less than or equal to the convergence error level, it directly proceeds to step S309 (step S305: No). In this way, a calculation time for the search process can be sufficiently provided for blocks that moved much, while the calculation time can be saved for blocks that moved less.

It repeats the foregoing processing in the predetermined search area (step S309: No, step S310) until it searches all the points in the search area, then proceeds to the next block in group #1 and repeats the foregoing processing (step S311 : No, step S312).

For group #2, the second detailed search section 37 performs the same routine as in group #1. That is. In FIG. 7, by replacing "group #1" with "group #2", this process is regarded as that for group #2.

The study control section 38 controls the motion timings and the motion order, and changes the foregoing "threshold value" and "convergence error level" for the first initial section 34, the second initial search section 35, the first detailed search section 36 and the second detailed search section 37. The foregoing description about the first detailed search section 36 and the second detailed search section 37 relates to the case in which there is no limit for the process time. Actually, the limit is set to the process time and the process order in order to keep the real-time processing. The study control section 38 controls the motion timings etc. of each of the sections for this case.

Figure 8:
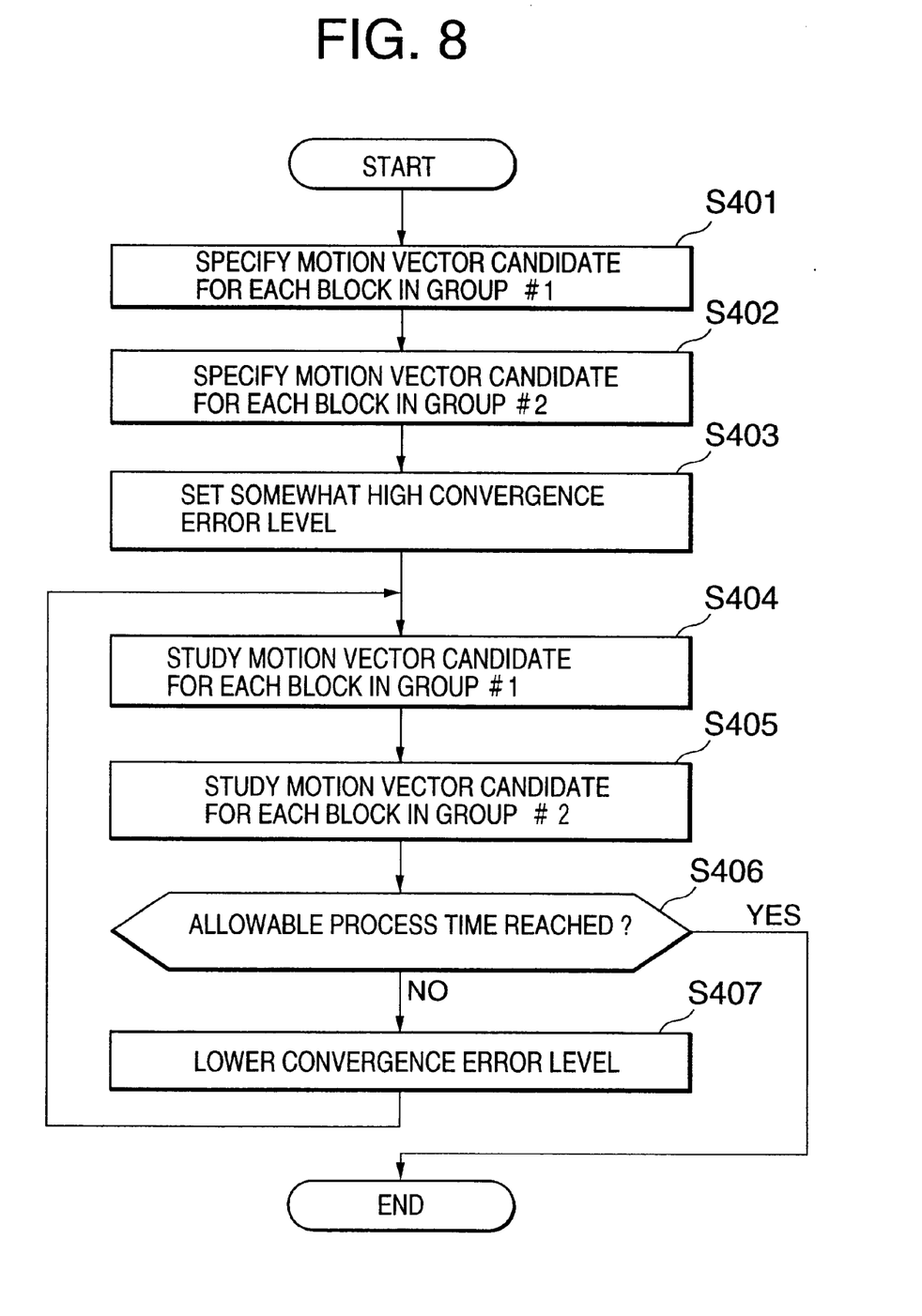
FIG. 8 is a flowchart showing a routine to be executed by a study control section.

The control procedure of the study control section 38 at the realtime processing follows, for example, FIG. 8.

Specifically, it first runs the first initial search section 34 in a limited area for each block in group #1 and calculates values of the mean error evaluation function in order to find a motion vector candidate pointing to a location of the area that gives the minimal value of the mean error evaluation function (step S401).

It proceeds to run the second initial search section 35 in order to specify a motion vector candidate for each block in group #2 by assigning thereto an average of the motion vector candidates of the adjacent blocks (step S402).

Thereafter, it runs the first detailed search section 36 for a specified time while setting the convergence error level to be a bit high in order for a motion vector candidate to be found easily (steps S403, S404). By doing this, a search point for each block in group #1 moves on the search path for a bit from the initial position. Next, it runs the second detailed search section 37 for a specified time while setting the convergence error level to be a bit high (step S405). Thus a search point for each block in group #2 moves on the search path for a bit from the initial position.

If there is a spare time for the motion vector detection at that time, that is, if the time consumed is still within an allowable process time range (step S406: No), it lowers the convergence error level (step S407) and controls the first detailed search section 36 to execute step S404 In order to find more accurate motion vector candidates. Then, it controls the second detailed search section 37 to execute step S405.

The initial value of the convergence error level and a changing magnitude thereof should depend on the dynamics of the movement of the target motion image data.

In this way, the number of times of execution of the first detailed search section 36 and the second detailed search section 37 can be adjusted between the case where the real-time processing is important and the case where the detecting accuracy is important.

Further, once a motion vector candidate for each block in group #1 is specified at tile first initial search section 34, a motion vector candidate for each block can be specified at the second Initial search section 35, the first detailed search section 36 and the second detailed search section 37 by simply calculating an average of motion vectors of the adjacent blocks, which saves a great amount of calculation. Moreover, since the average of the plurality of motion vector candidates is used for specifying the motion vector candidate, it is robust over unexpected deviation caused by noise, thus enabling the precise motion vector detection. In addition, unexpected deviation is more buffered by repeating the study so that the detection accuracy is further increased.

Further, the convergence error level is lowered by repeating the study so that a block can be matched with an area in the reference frame data more easily.

The motion vector detecting method of the present invention has been described as an improved method of the full search. On the other hand, using the foregoing motion vector detecting method hierarchically, it can be applied to the hierarchical search method using reduced resolution. In this case, the reduced amount of calculation and improved detecting precision can be expected as compared with the normal hierarchical search method using reduced resolution. Further, the improved motion vector detecting method can correct erroneous motion vectors detected at each level of hierarchy so that there are chances where an erroneous motion vector at a certain level of hierarchy can be corrected at the next level of hierarchy.

Furthermore, according to the motion vector detecting method, there can be expected an improvement in coding efficiencies at the prediction coding device 1. For example, by applying this method to the hierarchical search method using reduced resolution, such motion vectors can be obtained that a motion vector resembles the neighbor motion vectors and that their lengths are not extremely long even if the motion vectors are erroneous, In summary, according to the present invention, the wide search area can be ensured while chances of detecting erroneous motion vectors can be suppressed.

Further, since the present invention can reduce the calculation amount and assure the real-time processing, it can be implemented by software.

While the present invention has been described in terms of the preferred embodiment, the invention is not to be limited thereto, but can be embodied in various ways without departing from the principle of the invention as defined in the appended claims.

What is claimed is:

1. A motion vector detecting method comprising the steps of:

when detecting motion vectors between a first and a second image frame which are contiguous,
dividing the second image frame into blocks;
classifying the blocks into a first and a second group such that the mutually adjacent blocks belong to the different groups;
specifying a motion vector candidate for each block in the first group based on a mean error evaluation function between the first and second image frames;
assigning an average of the motion vector candidates of the adjacent blocks in the first group to a motion vector candidate for each of the blocks in the second group; and
updating the motion vector candidate of each of the blocks in the first group by assigning thereto an average of the motion vector candidates of the adjacent blocks in the second group.

2. A motion vector detecting method comprising:

a pre-process step of capturing a first and a second image frame which are contiguous, holding the first image frame, dividing the second image fame into blocks, and classifying the blocks into a first and a second group such that the mutually adjacent blocks belong to the different groups;

an initial search step of specifying a motion vector candidate for each of the blocks in the first group that points to a search point in the first image frame by choosing a vector from the corresponding block that gives a minimal value of a mean error evaluation function, and specifying a motion vector candidate for each of the blocks in the second group by assigning thereto an average of the motion vector candidates of the adjacent blocks in the first group;

a first detailed search step of updating the motion vector candidate of each of the blocks in the first group by studying an average vector represented by an average of the motion vector candidates of the adjacent blocks in the second group;

a second detailed search step of updating the motion vector candidate of each of the blocks in the second group by studying an average vector represented by an average of the motion vector candidates of the adjacent blocks in the first group; and a step of setting the updated motion vector candidate as a motion vector for each of the blocks.

3. The motion vector detecting method according to claim 2, wherein said initial search step specifies the motion vector candidate for each of the blocks in the first group by setting an initial search point to a location which implies no movement, gradually moving the search point from the initial search point, calculating a value of the mean error evaluation function for each of the search points, and choosing the vector which points to the search point which gives the minimal value of the mean error evaluation function.

4. The motion vector detecting method according to claim 2, wherein the study of said average vector is performed by calculating a value of a mean error evaluation function of pixels between the first and second image frames while moving a search point on the first image frame to a specific direction, and updating a current motion vector candidate of the corresponding block with a new motion vector candidate that points to a location whose value of the mean error evaluation function is smaller than that of the current motion vector candidate.

5. The motion vector detecting method according to claim 4, wherein said search point is moved on a spiral path.

6. The motion vector detecting method according to claim 5, wherein if a difference between the current motion vector candidate and the average vector its greater than a predetermined threshold value, the current motion vector candidate is replaced with the average vector and a point to which the average vector points is set as a new starting point of the search point.

7. The motion vector detecting method according to claim 4, wherein re-calculation of the mean error evaluation function is executed by changing the search point if said value of the mean error evaluation function exceeds a predetermined convergence error level, while proceeding to study the average vector of the next block in the same group immediately if said value of the mean error evaluation function does not exceed said convergence error level.

8. The motion vector detecting method according to claim 7, wherein said first and second detailed search steps are executed alternately, and said convergence error level is lowered every time execution of said first and second detailed search steps is repeated.

9. A motion vector detecting device comprising:

an image frame capturing section which captures a first and a second image frame that are contiguous;

a pre-processing section that divides the second image frame into blocks and classifies the blocks into a first and a second group such that the mutually adjacent blocks belong to the different groups; and a motion vector study section that approximately specifies a motion vector candidate for each of the blocks in the first group and a motion vector candidate for each of the blocks in the second group, and studies each of the motion vector candidates based on an average vector represented by an average of the motion vector candidates of the adjacent blocks so that a value of a mean error evaluation function becomes smaller.

10. The motion vector detecting device according to claim 9, wherein said motion vector study section approximately specifies said motion vector candidates for all the blocks, and proceeds to study said average vector for each of the blocks in the first group and said average vector for each of the blocks in the second group alternately.

11. The motion vector detecting device according to claim 10, wherein said motion vector study section studies the average vector of the next block in the same group immediately if the value of the mean error evaluation function does not exceed a predetermined convergence error level, and wherein said convergence error level is reduced upon repeating the study of the average vector.

12. A prediction coding device comprising an image data processing device that divides motion image data into image frames, and the motion vector detecting device according to claim 9, said motion vector detecting device detecting motion vectors from the first and second image frames which are outputted consecutively from the image data processing device, wherein said prediction coding device performs prediction coding through motion detection of the first image frame based on the motion vectors detected by the motion vector detecting device.

13. A computer-readable recording medium storing a program which causes a computer to execute the steps of:

capturing a first and a second Image frame which are contiguous, holding the first image frame, dividing the second image frame into blocks, and classifying the blocks into a first and a second group such that the mutually adjacent blocks belong to the different groups;

specifying a motion vector candidate for each of the blocks in the first group that points to a search point in the first image frame by choosing a vector from the corresponding block that gives a minimal value of a mean error evaluation function;

specifying a motion vector candidate for each of the blocks in the second group by assigning thereto an average of the motion vector candidates of the adjacent blocks in the first group;

updating the motion vector candidate of each of the blocks in the first group by studying an average vector represented by an average of the motion vector candidates of the adjacent blocks in the second group;

updating the motion vector candidate of each of the blocks in the second group by studying an average vector represented by an average of the motion vector candidates of the adjacent blocks in the first group; and setting the updated motion vector candidate as a motion vector for each of the blocks.

* * * * *